US012359277B2

(12) United States Patent
Taguchi et al.

(10) Patent No.: US 12,359,277 B2
(45) Date of Patent: Jul. 15, 2025

(54) ANNEALING FURNACE, METHOD OF CONSTRUCTING ANNEALING FURNACE, AND STRUCTURE FOR PREFABRICATION

(71) Applicant: MAFTEC Co., Ltd., Tokyo (JP)

(72) Inventors: Masakuni Taguchi, Fukuoka (JP); Yusaku Hata, Tokyo (JP); Mitsuo Suzuki, Tokyo (JP)

(73) Assignee: MAFTEC Co., Ltd., Tokyo (JP)

( * ) Notice: Subject to any disclaimer, the term of this patent is extended or adjusted under 35 U.S.C. 154(b) by 496 days.

(21) Appl. No.: 17/774,072

(22) PCT Filed: Oct. 19, 2020

(86) PCT No.: PCT/JP2020/039285
§ 371 (c)(1),
(2) Date: May 3, 2022

(87) PCT Pub. No.: WO2021/095449
PCT Pub. Date: May 20, 2021

(65) Prior Publication Data

US 2022/0380864 A1 Dec. 1, 2022

(30) Foreign Application Priority Data

Nov. 11, 2019 (JP) ................................ 2019-204281

(51) Int. Cl.
*C21D 9/56* (2006.01)
*C21D 1/26* (2006.01)
(Continued)

(52) U.S. Cl.
CPC ................ *C21D 9/56* (2013.01); *C21D 1/26* (2013.01); *F27B 9/28* (2013.01); *F27B 9/34* (2013.01);
(Continued)

(58) Field of Classification Search
CPC .......... C21D 9/56; C21D 1/26; C21D 9/0006; C21D 9/46; C21D 9/005; F27B 9/28;
(Continued)

(56) References Cited

U.S. PATENT DOCUMENTS 4,364,728 A * 12/1982 Stamp ....................... F27B 9/28 432/59
4,494,929 A * 1/1985 Fujioka ..................... F27B 9/28 432/59
(Continued)

FOREIGN PATENT DOCUMENTS

CN 105705663 B 8/2017
CN 105074020 B 4/2018
(Continued)

OTHER PUBLICATIONS

International Search Report for PCT/JP2020/039285 dated Dec. 8, 2020 [PCT/ISA/210].
(Continued)

*Primary Examiner* — Jessee R Roe
*Assistant Examiner* — Michael Aboagye
(74) *Attorney, Agent, or Firm* — Sughrue Mion, PLLC

(57) ABSTRACT

Provide is an annealing furnace, a method of constructing the annealing furnace, and a structure for prefabrication which make it possible to use a prefabricated construction method for the annealing furnace even in a long length. The annealing furnace includes a case, and plural rows of rolls at the top and the bottom of the inside of the case, the rolls being configured to convey a steel strip. The annealing furnace includes: horizontally parting faces where a body of the furnace can be horizontally divided, wherein each of horizontally parted sections parted by the horizontally parting faces further has vertically parting faces where the
(Continued)

horizontally parted sections can be divided in a direction vertical to a longitudinal direction of the body.

12 Claims, 8 Drawing Sheets

(51) Int. Cl.

| | |
|---|---|
| ***F27B 9/28*** | (2006.01) |
| ***F27B 9/34*** | (2006.01) |
| *F27B 9/36* | (2006.01) |
| *F27D 1/00* | (2006.01) |

(52) U.S. Cl.
CPC ........ *F27B 9/36* (2013.01); *F27D 2001/0059* (2013.01)

(58) Field of Classification Search
CPC ...... F27B 9/34; F27B 9/36; F27D 2001/0059; F27D 1/00; F27D 7/06; F23D 2900/21; F23D 91/02; F23M 2700/0053; F23M 2900/05003; F23M 3/16
USPC .......................................................... 266/103
See application file for complete search history.

(56) References Cited

U.S. PATENT DOCUMENTS

| | | | | |
|---|---|---|---|---|
| 9,957,585 | B2 * | 5/2018 | Takahashi | C21D 9/561 |
| 10,227,220 | B2 * | 3/2019 | Chambers | B66B 9/16 |
| 10,415,115 | B2 * | 9/2019 | Takahashi | C21D 1/767 |
| 2015/0361521 | A1 | 12/2015 | Takahashi et al. | |
| 2016/0265079 | A1 | 9/2016 | Takahashi et al. | |

FOREIGN PATENT DOCUMENTS

| | | | | |
|---|---|---|---|---|
| CN | 110129546 | A | 8/2019 | |
| JP | 60-133396 | U | 9/1985 | |
| JP | 7-21759 | U | 4/1995 | |
| JP | 2002-194427 | A | 7/2002 | |
| JP | 4057773 | B2 | 3/2008 | |
| JP | 2002194427 | * | 3/2008 | C21D 9/56 |
| JP | 2015-203133 | A | 11/2015 | |

OTHER PUBLICATIONS

Written Opinion for PCT/JP2020/039285 dated Dec. 8, 2020 [PCT/ISA/237].

* cited by examiner

ANNEALING FURNACE, METHOD OF CONSTRUCTING ANNEALING FURNACE, AND STRUCTURE FOR PREFABRICATION

CROSS REFERENCE TO RELATED APPLICATIONS

This application is a National Stage of International Application No. PCT/JP2020/039285 filed Oct. 19, 2020, claiming priority based on Japanese Patent Application No. 2019-204281 filed Nov. 11, 2019.

TECHNICAL FIELD

The present invention relates to an annealing furnace, a method of constructing an annealing furnace, and a structure for prefabrication.

BACKGROUND ART

FIG. 1 is a conceptual view of a galvanizing line with an annealing furnace as an example. An annealing furnace 100A shown in the drawing is provided with a heating chamber 92 configured to heat a steel strip 91 to a predetermined temperature, a soaking chamber 94 configured to maintain the heated steel strip at a constant temperature, cooling chambers 96, 96 configured to cool the soaked steel strip to a predetermined temperature, and further a galvanizing bath 98.

The steel strip 91 continuously goes between top rolls 93*a* provided around the upper face of the annealing furnace inside the annealing furnace and bottom rolls 93*b* provided around the lower face of the annealing furnace inside the annealing furnace. The steel strip 91 is conveyed in the annealing furnace, being heated, soaked, and further cooled.

In the example shown in FIG. 1, the heating chamber 92, the soaking chamber 94 and the cooling chambers 96, which are separate from one another, form the annealing furnace. These chambers may be unitedly formed for reasons of a construction site. The total length of facilities including the annealing furnace with the heating chamber 92, the soaking chamber 94 and the cooling chambers 96 reaches 30 to 50 m. The total length of an annealing furnace with the heating chamber 92, or the total length of an annealing furnace with the heating chamber 92 and the soaking chamber 94 is 10 to 25 m. The panel construction method has been conventionally employed when these various kinds of annealing furnaces are constructed.

FIG. 2 is a perspective view of an annealing furnace 100B with the heating chamber 92. According to the panel construction method, a top roll chamber 95*a* in which the top rolls 93*a* are arranged, a bottom roll chamber 95*b* in which the bottom rolls 93*b* are arranged, side panels 97, and shell panels 98 are manufactured in a factory, and are transported to and assembled in a construction site.

Specifically, the bottom roll chamber 95*b* is attached to props 99, the side panels 97 are attached above the bottom roll chamber 95*b*, and the top roll chamber 95*a* is put above the side panels 97. When the framework of a furnace body is made in this way, each of the shell panels 98 is sequentially put. Thereafter the joints are each welded, so that a shell is formed.

Next, a heat insulating material is stretched and put on the inside, and the bottom rolls 93*b*, the top rolls 93*a* and heaters 93*c* are installed.

The above-described panel construction method requires much labor and time for installation work at a construction site. Thus, a method that makes it possible to more simply construct the furnace in a shorter time is demanded. As such a method, a prefabricated construction method (block construction method) is proposed in Patent Literature 1.

In the prefabricated construction method of Patent Literature 1, blocks having shapes of horizontally round slices of a furnace body are made in a factory, and are transported to and stacked at a construction site, so that a heating furnace is constructed. Therefore, the amount of work at the construction site drastically decreases, which can make a construction period shorter.

CITATION LIST

Patent Literature

[Patent Literature 1] JP 2002-194427 A

SUMMARY OF INVENTION

Technical Problem

However, according to the prefabricated construction method of Patent Literature 1, it is necessary to transport the blocks from a factory to a construction site by a trailer when the construction site is in the inland. The lengths of the blocks are limited to such that the blocks can be transported by a trailer. Therefore, the prefabricated construction method of Patent Literature 1 cannot be applied when an annealing furnace in a long length is constructed, which is problematic.

In particular, the length of an annealing furnace with united heating zone and soaking zone may exceed 20 m. There is also a replacement demand for only the upper part as the bottom roll chamber is left as it is. However, a conventional prefabricated construction method cannot be used for an annealing furnace in a long length, which is problematic.

An object of the present invention is to provide an annealing furnace that can be made by a prefabricated construction method even when the annealing furnace has a long length, a method of constructing the annealing furnace, and a structure for prefabrication to constitute the annealing furnace.

Solution to Problem

As a result of their diligent studies to solve the above-described problems, the present inventors have found the following matters:

A prefabricated construction method can be used for an annealing furnace that can be both horizontally and vertically divided even in a long length;

When an annealing furnace that can be simply vertically divided is constructed, the structure thereof is weak, and the constructed annealing furnace may be not able to support its own weight. Or, even if able to support its own weight, the constructed annealing furnace may have poor resistance to earthquakes.

The atmosphere inside an annealing furnace is a hydrogen or nitrogen atmosphere. The inside is necessary to be blocked from the outside air. When an annealing furnace that can be simply vertically divided is constructed, the constructed annealing furnace includes cross-shaped joints, which may cause the problem of difficulty in securing sealability at the cross-shaped joints.

In a preferred embodiment of the present invention, an annealing furnace that can be simply vertically divided is not constructed, but vertically parting areas between horizontally parting faces are each suitably adjusted, which can solve the above-described further problem.

Based on the above matters, the present inventors have completed the following invention.

The first invention is an annealing furnace that includes a case, and plural rows of rolls at a top and a bottom of an inside of the case, the rolls being configured to convey a steel strip, the annealing furnace comprising: horizontally parting faces where a body of the furnace can be horizontally divided, wherein each of horizontally parted sections parted by the horizontally parting faces further has vertically parting faces where the horizontally parted section can be divided in a direction vertical to a longitudinal direction of the body.

In the first invention, preferably, at least one of the vertically parting faces is not at a position same as any of the vertically parting faces in the horizontally parted sections adjacent thereto in the longitudinal direction of the body.

In the first invention, positions of vertically adjacent ones of the vertically parting faces in the horizontally parted sections in the longitudinal direction of the body are preferably apart from each other by at least 1 m in the longitudinal direction.

In the first invention, preferably, structures for prefabrication which are parted at the horizontally parting faces and the vertically parting faces each include a secondary member for connecting the vertically parting faces on the structures for prefabrication to each other, and a width of the secondary member of one of any pair of the structures for prefabrication to be connected is different from that of another one of the pair in a horizontal direction.

In the first invention, preferably, the secondary member of the one structure for prefabrication of the pair is a secondary member with high strength, and the secondary member of the other structure for prefabrication of the pair is a secondary member easy to be bent.

In the first invention, preferably, the secondary members of the pair of the structures for prefabrication each include a fastener hole for fastening these secondary members to each other, the fastener hole having a size different between the secondary members.

In the first invention, a packing material is preferably provided on a joining face of each of the horizontally parting faces and the vertically parting faces on the structures for prefabrication.

In the first invention, preferably, the packing material provided on the joining face of each of the horizontally parting faces has a T-shape.

In the first invention, the packing materials are preferably formed from an inorganic fiber blanket.

In the first invention, a case constituting each of the structures for prefabrication is preferably provided with a shell formed from a steel shell on an outside thereof, and a heat insulating material with which the shell is lined.

Preferably, the annealing furnace according to the first invention further comprises a heater configured to heat the steel strip to be conveyed.

The annealing furnace according to the first invention is preferably a vertical-type annealing furnace.

The second invention is a method of constructing an annealing furnace including a case, and plural rows of rolls at a top and a bottom of an inside of the case, the rolls being configured to convey a steel strip, the method comprising: installing structures for prefabrication each having a horizontally parting face and a vertically parting face, so that the vertically parting faces face each other; and forming horizontally parted sections by joining the vertically parting faces, so that the annealing furnace has the horizontally parting faces, at the horizontally parting faces a body of the furnace can be horizontally divided, and the respective horizontally parted sections parted by the horizontally parting faces further have the vertically parting faces where the horizontally parted sections can be divided in a direction vertical to a longitudinal direction of the body.

Preferably, the method according to the second invention further comprises: stacking and installing, on the horizontally parted sections formed by joining the vertically parting faces or on the structures for prefabrication, another structure for prefabrication having the horizontally parting face and the vertically parting face; and joining the horizontally parting faces.

Preferably, the method according to the second invention further comprises: removing a tabular reinforcing member after the installing, the tabular reinforcing member being included in each of the structures for prefabrication on a face to be the vertically parting face, the tabular reinforcing member being for protecting the vertically parting face.

In the second invention, the forming the horizontally parted sections preferably comprises: fastening secondary members of any pair of the structures for prefabrication to be connected to each other with fasteners, thereafter welding the joining faces, and removing the fasteners, thereafter welding fastener holes, the secondary members being included in each of the structures for prefabrication parted at the horizontally parting faces and the vertically parting faces, the secondary members being for connecting the vertically parting faces of the structures for prefabrication to each other, the fastener holes being included in the secondary members of the pair, the fastener holes being for connecting these secondary members to each other.

In the second invention, the forming the horizontally parted sections preferably comprises: holding packing materials between the vertically parting faces, and between the horizontally parting faces, wherein the packing materials held between the vertically parting faces each have a T-shape.

In the second invention, the structures for prefabrication preferably include a heat insulating material with which a shell formed from an iron shell on an outside thereof is lined, and which is made from an inorganic fiber in advance before the installing.

In the second invention, the structures for prefabrication preferably include a heater configured to heat a steel plate in advance before the installing.

The third invention is a structure for prefabrication comprising: a horizontally parting face and a vertically parting face at which the body of the annealing furnace according to the first invention can be divided, the structure for prefabrication constituting the annealing furnace.

Advantageous Effects of Invention

An annealing furnace, a method of constructing the annealing furnace, and a structure for prefabrication according to the present invention make it possible to install the annealing furnace by a prefabricated construction method even when the annealing furnace has a long length. The annealing furnace can be constructed in a short term because a prefabricated construction method is employed. An annealing furnace according to a preferred embodiment of the present invention which includes vertically parting faces at positions adjusted in a longitudinal direction of the furnace body has good strength and good sealability.

DESCRIPTION OF EMBODIMENTS

Hereinafter an annealing furnace, and a method of constructing the annealing furnace as an example according to embodiments of the present invention will be described. It is noted that the scope of the present invention is not limited to any embodiment described below.

Unless otherwise specified, the description of "a to b" showing a numeral range means "at least a and at most b" and also encompasses the meanings of "preferably more than a" and "preferably less than b".

Any upper or lower limit concerning the numerical range in this description, even if being slightly beyond the numerical range specified by the present invention, shall be encompassed in equivalents of the present invention as long as causes the same operation and effect as that within the numerical range.

<Annealing Furnace>

An annealing furnace according to the present invention includes a case, and plural rows of rolls at the top and the bottom of the inside of the case, the rolls being configured to convey a steel strip, the annealing furnace comprising: horizontally parting faces where a body of the furnace can be horizontally divided, wherein each of horizontally parted sections parted by the horizontally parting faces further has vertically parting faces where the horizontally parted section can be divided in a direction vertical to a longitudinal direction of the body.

In the present invention, "annealing furnace" mainly refers to an annealing furnace for cold rolling which is for continuously annealing a cold rolled steel plate, and for example, refers to a continuous annealing furnace used in a continuous annealing line (CAL), a galvanizing line (CGL), or the like. However, "annealing furnace" in the present invention is not limited to the above, but means a general continuous annealing furnace that makes it possible to continuously anneal a steel plate.

The meaning of the annealing furnace also encompasses an annealing furnace with a cooling furnace, in addition to a heating furnace and a soaking pit. Preferably, the heating furnace and the soaking pit are further provided with heaters configured to heat a steel strip to be conveyed. The annealing furnace is preferably a vertical-type annealing furnace.

Figure 1:
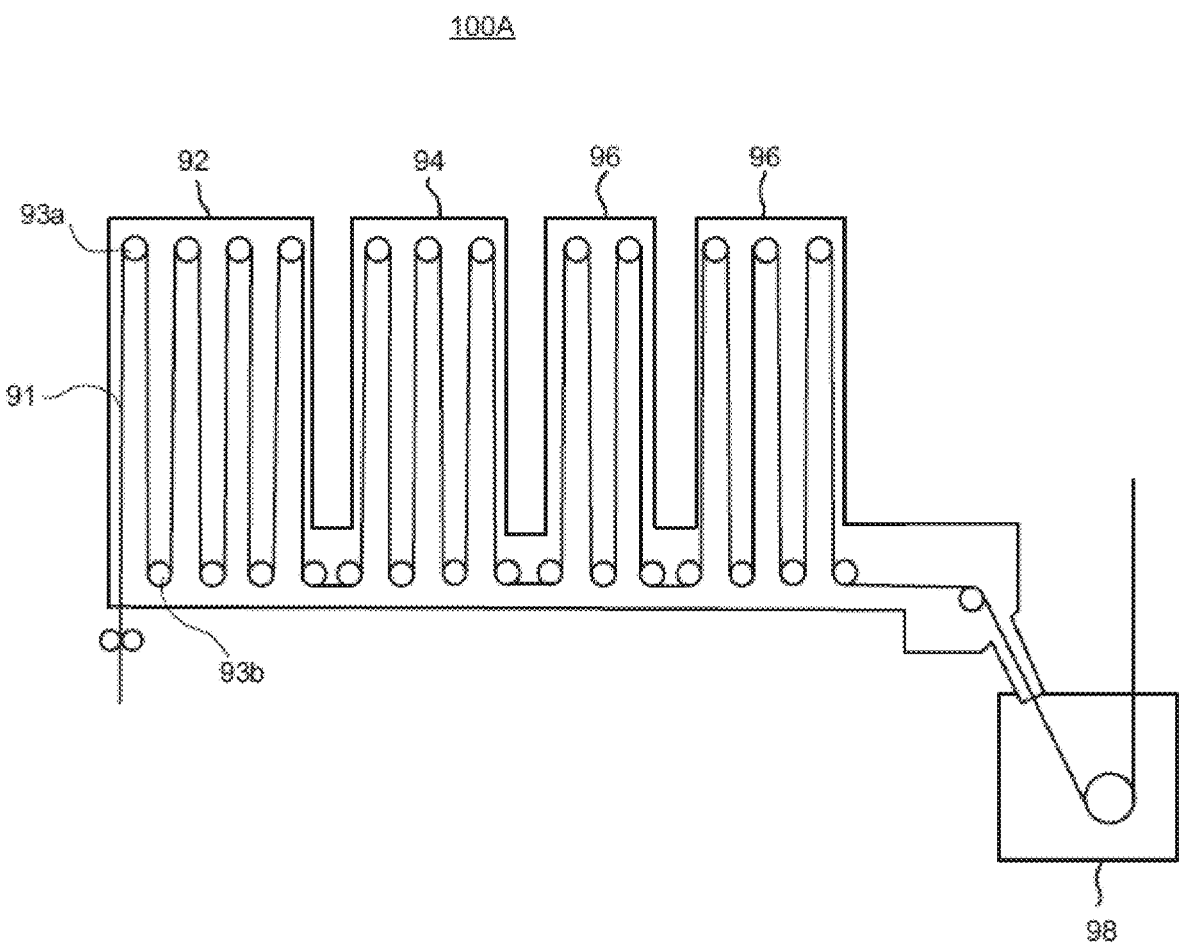
FIG. 1 is a conceptual view showing the structure of a general annealing furnace.
Figure 2:
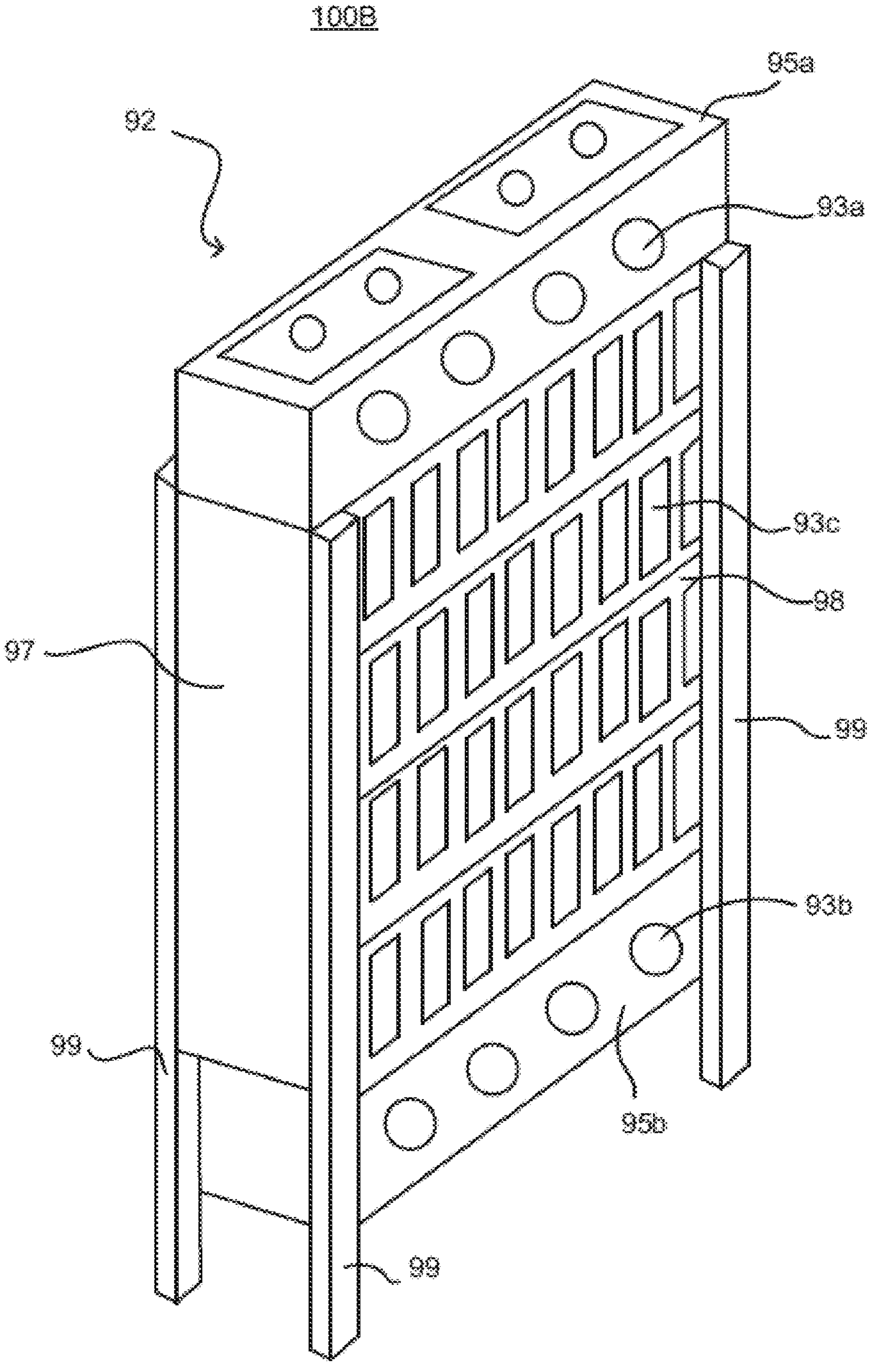
FIG. 2 is an external perspective view of a conventional annealing furnace.
Figure 3:
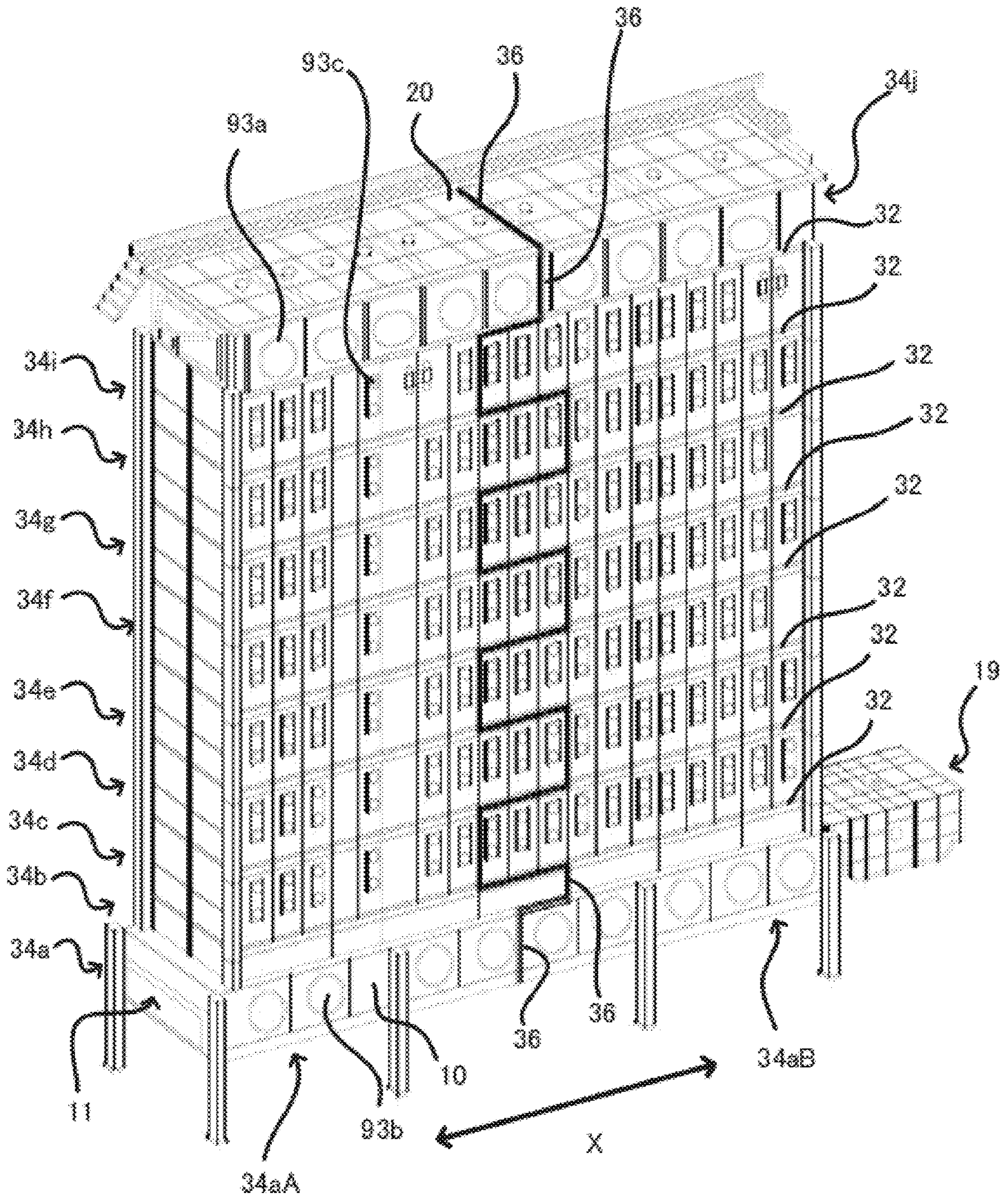
FIG. 3 is an external perspective view of an annealing furnace according to the present invention.

FIG. 3 is a perspective view of an annealing furnace 100C according to a preferred embodiment of the present invention. The annealing furnace 100C shown in the drawing is an annealing furnace with united heating zone and soaking zone. A steel strip that has been introduced from an entry 11 of the annealing furnace 100C is conveyed toward an exit 19 of the furnace via the bottom rolls 93*b* and the top rolls 93*a* successively. The heaters 93*c* configured to heat the steel strip are disposed between the bottom rolls 93*b* and the top rolls 93*a*.

The numbers of the bottom rolls 93*b* and the top rolls 93*a* are not particularly limited. The bottom rolls 93*b* and the top rolls 93*a* in appropriate numbers are used according to the length of the annealing furnace. The bottom rolls 93*b* are rotatably fixed to a lower portion of the case, specifically, to a bottom roll chamber 10. The top rolls 93*a* are rotatably fixed to an upper portion of the case, specifically, to a top roll chamber 20.

The plural heaters 93*c* are arranged along a conveying path for the steel strip between the top rolls 93*a* and the bottom rolls 93*b*. The number of the arranged heaters is not particularly limited, but is suitably adjusted according to the heating temperature of the steel strip. The heating temperature of the steel strip may be adjusted by first arranging the maximum number of the heaters as long as the heaters can be arranged, and turning off a part of the heaters. The type of the heaters is not particularly limited, but a radiant tube, a tube heater, a high-frequency induction heating type heater, or the like may be used. In FIG. 3, radiant tube-type heaters are installed.

Figure 4:
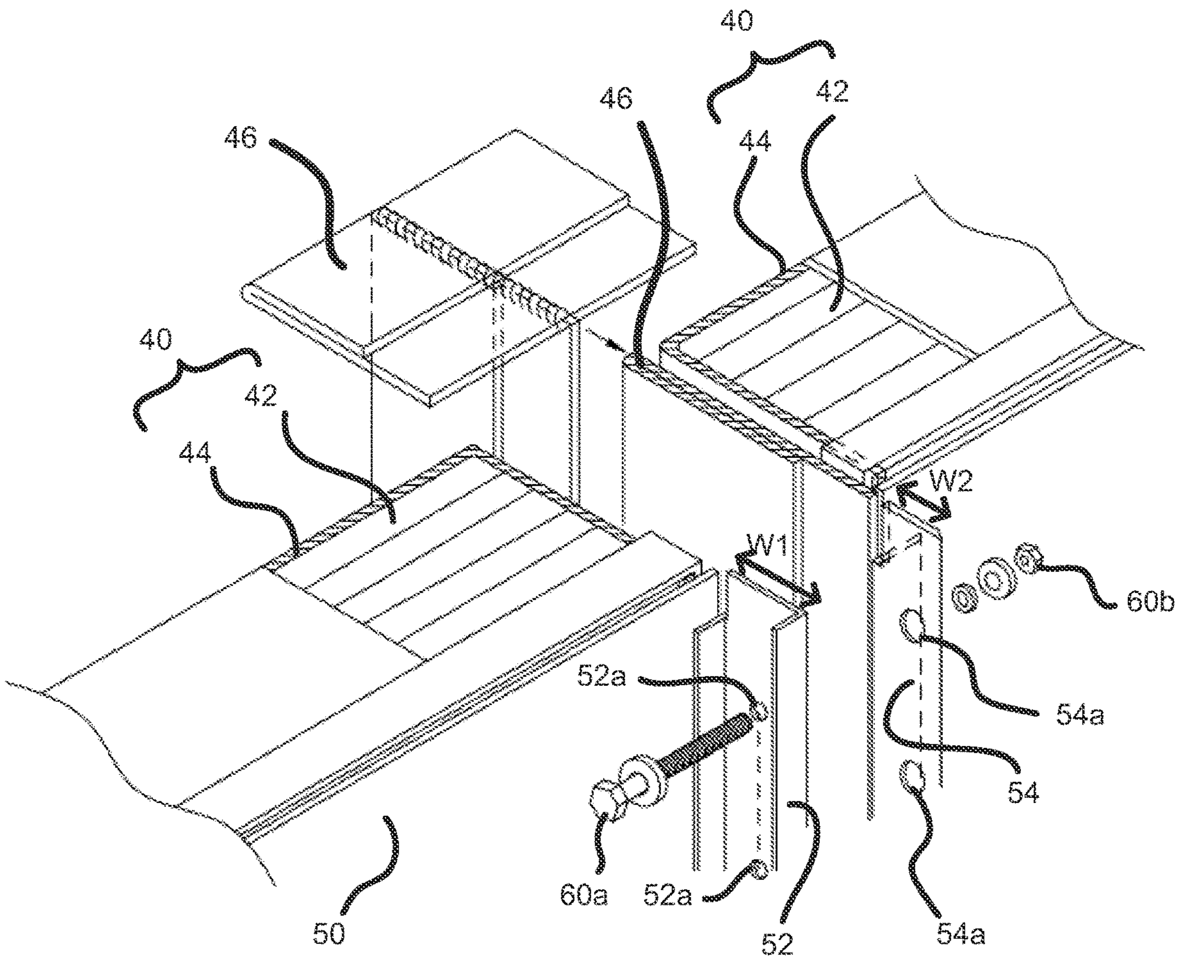
FIG. 4 is a conceptual view showing a way of joining vertically parting faces in the annealing furnace according to the present invention.

As shown in FIG. 4, the case of the annealing furnace is constituted of shells 50 formed from a steel shell. The cases of a heating furnace 92 and a soaking pit 94 are provided with shells formed from a steel shell 50 on the outside thereof, and heat insulating materials 40 with which the shells 50 are lined. The kind of the heat insulating materials 40 is not particularly limited as long as the heat insulating materials 40 have the effect of thermally insulating the inside of the annealing furnace from the outside. For example, an inorganic fiber blanket or an inorganic fiber block that is a heat insulating material including an inorganic fiber may be used. In the example shown in FIG. 4, an inorganic fiber blanket 42 and an inorganic fiber blanket 44 with less shots are used in combination as the respective heat insulating materials 40. Other than this, an inorganic fiber block may be used instead of the inorganic fiber blanket 42, and a heat-resistant stainless steel plate, an aluminum oxide cloth, or the like may be used instead of the inorganic fiber blanket 44.

(Horizontally Parted Section)

As shown in FIG. 3, the annealing furnace 100C according to the present invention has horizontally parting faces 32. The members parted at the horizontally parting faces 32 are referred to as horizontally parted sections 34. Therefore, the annealing furnace 100C according to the present invention is formed by stacking the plural horizontally parted sections 34 sequentially. Specifically, horizontally parted sections 34*b* to 34*i* are sequentially stacked on a horizontally parted section 34*a* corresponding to the bottom roll chamber, and a horizontally parted section 34*j* corresponding to the top roll chamber is stacked on these stacked portions.

(Structure for Prefabrication)

Each of the horizontally parted sections 34 parted at the horizontally parting faces 32 further has vertically parting faces 36 (in FIG. 3, the numerical sign is given to the vertically parting faces in the lowest horizontally parted section, and the horizontally parted sections next thereto and corresponding to the top roll chamber, but otherwise omitted). The vertically parting faces 36 are faces where the horizontally parted sections 34 are parted in a direction vertical to a longitudinal direction of the furnace body (X-direction in FIG. 3). The members obtained by parting the horizontally parted sections 34 at the vertically parting faces 36 are referred to as structures for prefabrication (e.g., the structures for prefabrication of the horizontally parted section 34*a* are referred to as structures for prefabrication 34*a*A and 34*a*B from the left in the drawing).

Thus, in the annealing furnace 100C according to the present invention, the horizontally parted sections 34 can be further divided into the structures for prefabrication 36A and 36B. Therefore, the structures for prefabrication can be also applied to an annealing furnace of a long length by adjusting the lengths of the structures for prefabrication 36A and 36B so that the structures for prefabrication 36A and 36B can be transported by a trailer.

The horizontally parted sections 34 may each have a plurality of the vertically parting faces 36, and may be configured to be each divided into two or more structures for prefabrication. However, for example, when the horizontally parted sections 34 each include two vertically parting faces 36, the strength of the structures for prefabrication on the end sides in the longitudinal direction is maintained because the block structures are provided with side panels, but the structure for prefabrication at the center includes only front panels as a panel.

In the present invention, preferably, at least one of the vertically parting faces is not at the position same as any of the vertically parting faces in the horizontally parted sections adjacent thereto in the longitudinal direction of the body. In the annealing furnace shown in FIG. 3, which is according to a preferred embodiment of the present invention, the vertically parting faces 36 in one of the horizontally parted sections 34 are not at the same position in the longitudinal direction of the furnace body as those in any of the horizontally parted sections 34 that is vertically adjacent to the one horizontally parted section 34. Such a structure makes it possible to strengthen the annealing furnace in structure. That is, when the annealing furnace can be simply divided vertically, each of the vertically parting faces 36 in the horizontally parted sections 34 and that in the horizontally parted sections 34 just thereabove or therebelow are at the same position in the longitudinal direction of the furnace body. However, this causes the welded portions that are weak in structure to line up straight, which leads to the annealing furnace weak in structure. The present invention can prevent this.

When the vertically parting faces 36 in the horizontally parted sections 34 are each at the same position in the longitudinal direction of the furnace body as described above, the welded portions line up straight both vertically and horizontally, which causes cross-shaped joints. The atmosphere inside an annealing furnace is, for example, a hydrogen or nitrogen atmosphere, and the inside is necessary to be blocked from the outside air. However, when such a cross-shaped joint is present, it is very difficult to weld the joint for securing sealability. The present invention can prevent this.

The positions of vertically adjacent ones of the vertically parting faces 36 in the horizontally parted sections 34 in the longitudinal direction of the furnace body are apart from each other by at least 1 m, more preferably at least 2 m, and further preferably at least 3 m in the longitudinal direction. The positions of the above-described vertically parting faces 36 at least 1 m apart from each other can lead to a stronger annealing furnace in structure. The angles of the vertically parting faces with the horizontally parting faces may be suitably selected, but are preferably 80° to 90° (perpendicular), and more preferably 88 to 90° (perpendicular). The vertically parting faces may form straight lines, but may bend in the middle or may form curved lines.

(Secondary Member)

When the structures for prefabrication are installed and the parting faces are joined to each other as in the description of the method of constructing the annealing furnace described later, each of the structures for prefabrication is preferably provided with a secondary member for joining the parting faces in order to maintain the strength in joining the parting faces.

The secondary members include a U-shaped member (channel, channel steel) 52 and an L-shaped member (angle, angle steel) 54 shown in FIG. 4, but are not limited thereto. Various types of secondary members may be used as long as the adherence of the parting faces and the strength in joining the parting faces to each other can be maintained. The secondary members are joined to the shells 50 included in the structures for prefabrication by a usual way such as welding. A secondary member provided in one of a pair of the structures for prefabrication to be joined and a secondary member provided in the other structure for prefabrication are joined by welding, so that the structures for prefabrication can be joined to each other and the sealability can be secured.

There are the horizontally parting faces 32 and the vertically parting faces 36 in the annealing furnace according to the present invention as parting faces. When the horizontally parting faces 32 are joined, the weight of any of the horizontally parted sections 34 on the upper side can give the adherence to the horizontally parting faces 32, and in this respect, welding while the strength in the joining is maintained is easy. In contrast, when the vertically parting faces 36 are joined, it is necessary to additionally find a way to closely adhere the structures for prefabrication to each other. Hereinafter various forms for maintaining the adherence of the parting faces (the vertically parting faces 36 in particular), and the strength in joining the parting faces (the vertically parting faces 36 in particular) will be described.

Width of Secondary Member

Preferably, the width of the secondary member of one of any pair of the structures for prefabrication to be connected is different from that of the other structure for prefabrication in the horizontal direction of the secondary members (W1 and W2 in FIG. 4). Here, the width in the horizontal direction means a width in the horizontal direction in a state where the structures for prefabrication are constructed as the annealing furnace. When these secondary members are made to face each other, different widths between the secondary members cause the respective ends of one secondary member not to be flush with those of the other secondary member, but any end of one of them to protrude. This improves workability in the welding.

Shape of Secondary Member

Preferably, the secondary member of the one structure for prefabrication of the pair is a secondary member with high strength, and the secondary member of the other structure for prefabrication of the pair is a secondary member easy to be bent. The secondary member of high strength may be the U-shaped member (channel) 52, which is connected to the structure for prefabrication on the left in FIG. 4. The secondary member easy to be bent may be the L-shaped member (angle) 54, which is connected to the structure for prefabrication on the right in FIG. 4.

Using a connection member of high strength as one of the connection members can lead to good strength in joining the parting faces and good strength of the entire structure. Using a connection member easy to be bent as the other connection member can give the adherence of the structures for prefabrication to each other. Therefore, this example can be said to be preferable when the vertically parting faces, which hardly exhibit adherence, are connected to each other.

Fastener Hole

Preferably, the secondary members of the pair of the structures for prefabrication to be connected each include fastener holes 52*a* and 54*a* for fastening these secondary members to each other. The fastener holes 52*a* and 54*a* represent holes for putting fasteners 60*a* and 60*b* such as bolts and nuts thereinto. When the structures for prefabrication are joined to each other, the secondary members can be closely adhered to each other by inserting and fastening the fasteners 60*a* and 60*b* to the fastener holes 52*a* and 54*a*. Good adherence of the structures for prefabrication to each other can be achieved by welding the joining faces of the secondary members in this state. After the secondary members are welded, the fasteners 60*a* and 60*b* are removed.

The sizes of the fastener holes 52*a* and 54*a* are preferably different from those of the other secondary member, respectively. In view of an achievement in securing the sealability for the structures for prefabrication, the surroundings of the fastener holes 52*a* and 54*a* are welded after the fasteners 60*a* and 60*b* are removed. Meanwhile, the sizes of the fastener holes 52*a* and 54*a* different between the one and the other secondary members cause the ends of the fastener holes 52*a* and 54*a* of these secondary members not to be flush, but any end of one of them to protrude. This improves workability in the welding. The structure having the fastener holes 52*a* and 54*a* can give the adherence of the structures for prefabrication to each other, using the fasteners 60*a* and 60*b*, therefore can be said to be preferable when the vertically parting faces are connected to each other. The interval between the fastener holes is not particularly limited, but the pitch for the fastener holes may be 200 to 400 mm. The sizes of the fastener holes are not particularly limited, but are each preferably at least 10 mm in diameter, and more preferably each at least 16 mm in diameter. The differences in the sizes of the fastener holes are not particularly limited, but is each preferably at least 6 mm in diameter, and is each more preferably at least 10 mm in diameter.

(Packing Material)

As shown in the one example of a portion where the vertically parting faces 36 are joined in FIG. 4, a packing material 46 is preferably provided on the joining face of each of the horizontally parting faces 32 and the vertically parting faces 36 on the structures for prefabrication. The joining face provided with the packing material 46 refers to a joining face of the heat insulating material 40 included in one of any pair of the structures for prefabrication and the heat insulating material 40 included in the other structure for prefabrication. Providing the packing materials 46 results in no gap between the heat insulating materials 40, which can improve a heat insulation property, and can prevent heat from penetrating the outer wall portions (shells) of the structures for prefabrication.

In view of no gap described above, the packing materials 46 are preferably used, being folded as shown in FIG. 4. This makes it possible to more effectively eliminate gaps between the heat insulating materials 40 by the restoring force of the folded packing materials 46. The shape of the packing material given to each of the horizontally parting faces 32 is not particularly limited. For example, a belt-like packing material that can cover the joining face of each of the horizontally parting faces 32 may be used. In contrast, the packing material given to each of the vertically parting faces 36 preferably has a T-shape. The packing material having a T-shape makes it possible to vertically fix the position of the packing material 46 on each of the vertically parting faces 36, which can reduce a risk that the packing material slips down and gaps are left. In the example in FIG. 4, both folded band-like packing material and folded T-shaped packing material are arranged on the joining faces of the vertically parting faces.

The packing material 46 may be formed from a heat-resistant material without any particular limitations. For example, a packing material formed from an inorganic fiber blanket may be preferably used. Specifically, MAFTEC manufactured by Mitsubishi Chemical Corporation may be used as the inorganic fiber blanket. The method of producing the T-shaped packing material is not particularly limited, but examples thereof include a method of folding two inorganic fiber blankets individually, laying the one on the other folded inorganic fiber blanket in the form of T, and fixing the overlapping portion with an alumina rope.

<Method of Constructing Annealing Furnace>

The above-described annealing furnace, i.e., the annealing furnace that includes the case, and plural rows of the rolls at the top and the bottom of the inside of the case, the rolls being configured to convey a steel strip, the annealing furnace comprising: the horizontally parting faces 32 where the furnace body can be horizontally divided, wherein each of the horizontally parted sections 34 parted by the horizontally parting faces 32 further has the vertically parting faces 36 where the horizontally parted sections 34 can be divided in a direction vertical to the longitudinal direction of the body can be constructed by the following method:

A method of constructing the annealing furnace according to the present invention comprises: installing the structures for prefabrication each having the horizontally parting face 32 and the vertically parting face 36, so that the vertically parting faces 36 face each other; and forming the horizontally parted sections 34 by joining the vertically parting faces 36.

A method of constructing the annealing furnace according to a preferred embodiment comprises: stacking and installing, on the horizontally parted sections 34 formed by joining the vertically parting faces 36 or on the structures for prefabrication, another structure for prefabrication having the horizontally parting face 32 and the vertically parting face 36; and joining the horizontally parting faces 32.

Figure 5:
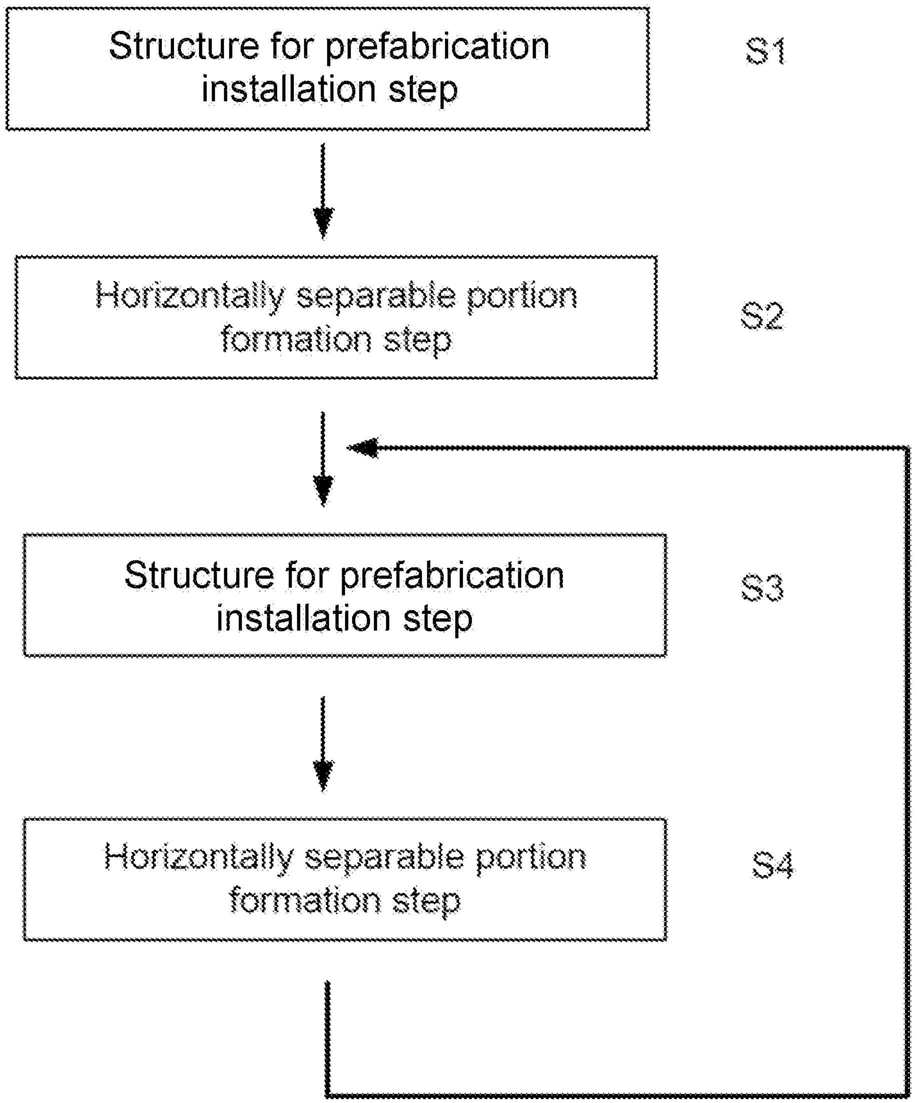
FIG. 5 is a flowchart of a method of constructing the annealing furnace according to the present invention.

FIG. 5 is a flowchart of the method of constructing the annealing furnace according to a preferred embodiment of the present invention. In a "structure for prefabrication installation step" S1, the structures for prefabrication at the bottom are installed. Thereafter the vertically parting faces of the structures for prefabrication are joined to each other in a "horizontally parted section formation step" S2, so that the horizontally parted section at the bottom is formed.

In a "structure for prefabrication installation step" S3, the structures for prefabrication at the second tier are installed. Thereafter the vertically parting faces of the structures for prefabrication are joined to each other, and the horizontally parting faces of the horizontally parted sections at the first and second tiers are also joined in a "horizontally parted section formation step" S4, so that the horizontally parted section at the second tier is formed. In S4, either the joining of the vertically parting faces or the joining of the horizontally parting faces may be performed first.

Thereafter S3 and S4 are repeated a plurality of times. Thus, the horizontally parted sections are sequentially formed. Finally, the top roll chamber is formed in the same manner in S3 and S4, so that the annealing furnace is constructed by the construction method according to the present invention.

For the annealing furnace 100C shown in FIG. 3, the structures for prefabrication 34*a*A and 34*a*B are installed in S1, and the vertically parting faces 36 of these structures for prefabrication are joined, so that the horizontally parted section 34*a*, i.e., the bottom roll chamber 34*a* at the bottom is formed in S2. When the existing bottom roll chamber is left as it is in replacement work of a furnace body, the method according to the present invention may be used for replacing the furnace body above the bottom roll chamber.

In S3, the structures for prefabrication 34*b*A and 34*b*B are installed. In S4, the vertically parting faces 36 of these structures for prefabrication are joined, so that the horizontally parted section 34*b* at the second tier is formed, and the horizontally parting faces 32 of the formerly formed horizontally parted section 34*a* and the horizontally parted section 34*b* are joined.

Thereafter S3 and S4 are repeated, so that the horizontally parted sections 34*c* to 34*i* are sequentially formed. Finally, the top roll chamber 34*j* is formed in the same manner in S3 and S4, so that the annealing furnace 100C is constructed by the construction method according to the present invention.

The method of installing the structures for prefabrication on the horizontally parted section 34 formed by joining the vertically parting faces 36 has been described. One may install the structure for prefabrication, further install another structure for prefabrication thereon, and join the horizontally parting faces 32 between these structures for prefabrication first, thereafter join the vertically parting faces 36 of the structures for prefabrication. Or, one may join the vertically parting faces 36 of these structures for prefabrication first, thereafter join the horizontally parting faces 32 thereof. These examples are also encompassed in the scope of the present invention.

Hereinafter the steps will be each described in detail.

(Structure for Prefabrication Installation Step)

Figure 6:
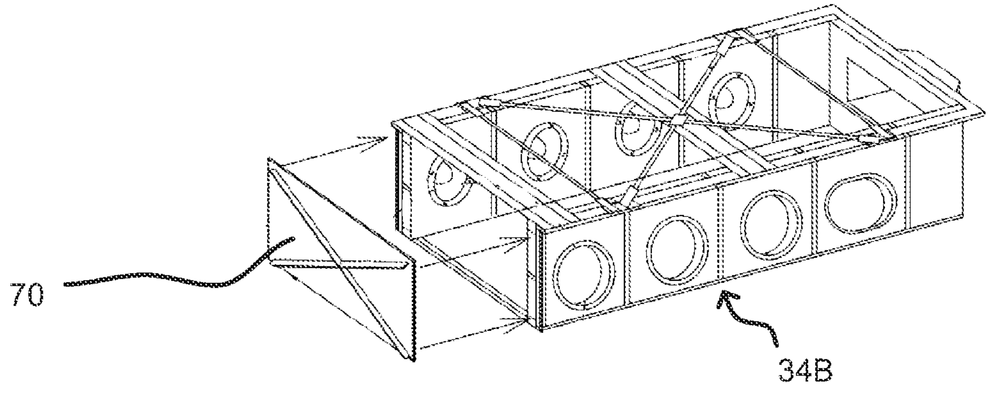
FIG. 6 is a perspective view of a structure for prefabrication to constitute the annealing furnace according to the present invention.

FIG. 6 is a perspective view of the structure for prefabrication 34B. The structures for prefabrication are made in a factory in advance, thereafter transported to a construction site. In the structure for prefabrication installation step, the transported structures for prefabrication are installed with, for example, a crane, at a position where the annealing furnace is to be constructed. The heat insulating materials 40 are exposed to the vertically parting faces 36 of the structures for prefabrication made in a factory. It is demanded to protect the exposed heat insulating materials 40 while the structures for prefabrication are transported from a factory to a construction site, are stored at a construction site, further, are craned up, etc. For this, the structures for prefabrication each preferably include a tabular reinforcing member 70 on the vertically parting face 36 for protecting the vertically parting face 36. When the structures for prefabrication are transported from a factory to a construction site, it is necessary to increase the strength of the structures for prefabrication so that the structures for prefabrication will not deform. For this also, the structures for prefabrication each desirably include the tabular reinforcing member 70.

When the structures for prefabrication each including the tabular reinforcing member 70 are used, it is necessary to include the step of removing the tabular reinforcing members 70 before the vertically parting faces 36 are joined. The tabular reinforcing members 70 may be removed before the structures for prefabrication are craned up. However, the tabular reinforcing members 70 are preferably removed after the structures for prefabrication are installed in the vicinity of a construction place in order to prevent the structures for prefabrication from deforming when the structures for prefabrication are craned up. Here, the vicinity of a construction place is a place shifting approximately 100 mm from the construction place. The structures for prefabrication are installed in a place shifting from the construction place first in order to secure a space where the tabular reinforcing members 70 are removed, thereafter are shifted to the construction place after the tabular reinforcing members 70 are removed, and the vertically parting faces 36 are joined.

The way of attaching the tabular reinforcing members 70 to the structures for prefabrication is not particularly limited. For example, the tabular reinforcing members 70 may be fixed, using the fastener holes 52*a* and 54*a*, which are formed in the secondary members 52 and 54 formed on the vertically parting faces 36 of the structures for prefabrication.

The structures for prefabrication preferably include the heat insulating materials 40, with which the shells 50 formed from a steel shell on the outside are lined, and which is made from an inorganic fiber, in advance before the structure for prefabrication installation step. The structures for prefabrication preferably include the heaters 93*c*, which are configured to heat a steel plate, in advance before the structure for prefabrication installation step. In other words, if the heat insulating materials or the heaters, or all of them are installed in the structures for prefabrication in advance at the manufacturing stage in a factory, only sequential installation and joining of the transported structures for prefabrication are necessary to perform at a construction site, which makes it possible to further reduce the construction time.

(Horizontally Parted Section Formation Step)

In the horizontally parted section formation step, the vertically parting faces 36 of the installed structures for prefabrication are joined to each other, so that the horizontally parted section 34 is formed. The vertically parting faces 36 are preferably joined by welding the secondary members included therein.

As described above, the vertically parting faces 36 hardly exhibit adherence. Thus, the secondary members on the vertically parting faces 36 of any pair of the structures for prefabrication to be connected each include fastener holes 52*a* and 54*a* for fastening these secondary members to each other.

Figure 7:
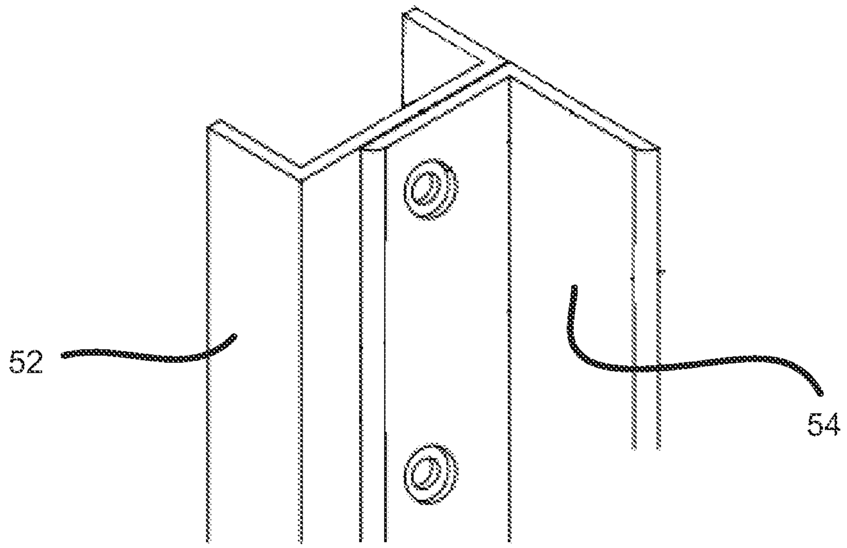
FIG. 7 is a perspective view of secondary members on the vertically parting faces of the annealing furnace according to the present invention.

In the horizontally parted section formation step, as shown in FIG. 4, the secondary members are preferably fastened to each other with the fasteners 60*a* and 60*b*. This makes it possible for the secondary members to be closely adhered to each other. Thereafter it is preferable to weld the joining faces, remove the fasteners, and then weld the fastener holes. In the example in FIG. 4, the respective fastener holes of the secondary member on the right of the drawing are larger than those on the left. Therefore, it is possible to perform the welding from the right side. FIG. 7 is a perspective view of the right side of the joined secondary members. Thus, the sealability can be secured by welding the surroundings of the fastener holes from the right side.

(Packing Material Holding Step)

Figure 8:
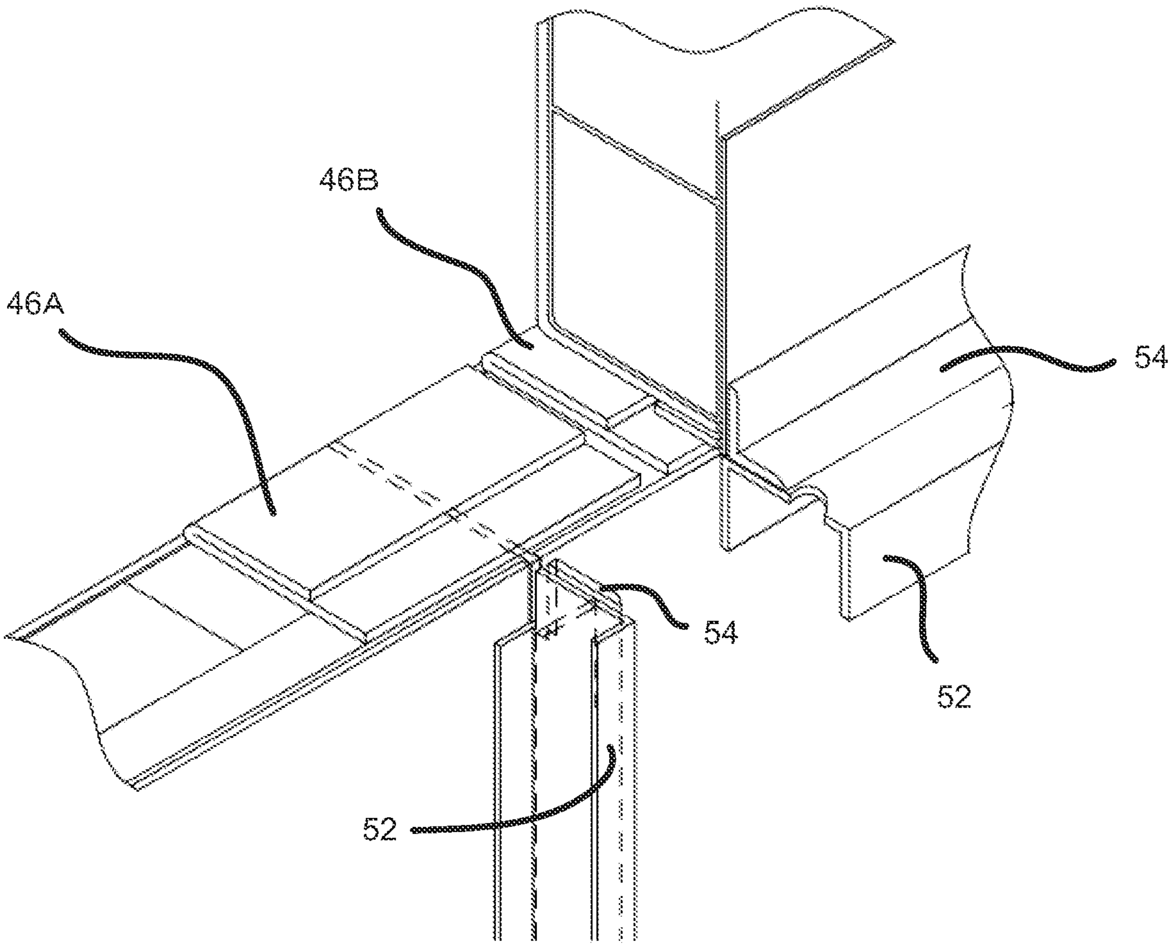
FIG. 8 is a schematic view showing a state of packing materials on the vertically parting faces and the horizontally parting faces of the annealing furnace according to the present invention.

The horizontally parted section formation step preferably comprises: holding the packing materials 46 between the vertically parting faces 36, and between the horizontally parting faces 32. FIG. 8 is a schematic view showing a state where the parting faces are joined to each other with a packing material 46A held between the vertically parting faces 36, and a packing material 46B held between the horizontally parting faces 32. In FIG. 8, the structure is partially omitted in order to show the state of the packing materials 46A and 46B.

The packing material 46B to be held between the horizontally parting faces 32 is disposed on the horizontally parting face 32 of the horizontally parted section 34 already formed in the structure for prefabrication installation step, before the next structure for prefabrication is installed.

The structures for prefabrication are installed, and before the vertically parting faces 36 are made to face each other, the packing material 46A to be held between the vertically parting faces 36 is disposed between the vertically parting faces 36. The packing material 46A held between the vertically parting faces 36 preferably has a T-shape.

EXAMPLES

Hereinafter a construction example of the annealing furnace 100C including the heating furnace 92, which is shown in FIG. 3, will be described as an example.

The structures for prefabrication to constitute the annealing furnace 100C were made in a factory. The width of each of the structures for prefabrication was 3 m, and the height thereof in the vertical direction was 2.7 m. The length of the structure for prefabrication (bottom roll chamber) 34*a*A, which is on the left of the drawing, in the longitudinal direction was 11 m. The length of the structure for prefabrication (bottom roll chamber) 34*a*B, which is on the right of the drawing, in the longitudinal direction was also 11 m. The length of the structure for prefabrication 34*b*A in the longitudinal direction was 12 m. The length of the structure for prefabrication 34*b*B in the longitudinal direction was 10 m. The length of the structure for prefabrication 34*c*A in the longitudinal direction was 10 m. The length of the structure for prefabrication 34*c*B in the longitudinal direction was 12 m. The same was applied to the length of each of the structures for prefabrication above the foregoing structures for prefabrication. The length of the top roll chamber 34*j*A, which was on the left, in the longitudinal direction was 11.5 m. The length of the top roll chamber 34*j*B, which was on the right, in the longitudinal direction was 10.5 m.

The structures for prefabrication were each lined with the heat insulating material 40 inside the shell in a factory. The channel 52 and the angle 54 having the fastener holes shown in FIG. 4 were joined to the vertically parting face 36 and the horizontally parting face 32 of each of the structures for prefabrication. The channel 52 was joined to the vertically parting face 36 of each of the structures for prefabrication on the left of the drawing, and the angle was joined to the vertically parting face 36 of each of structures for prefabrication on the right of the drawing. The angle was joined to the horizontally parting face on the top of each of the structures for prefabrication, and the channel was joined to the horizontally parting face on the bottom thereof. The tabular reinforcing plates 70 each having a thickness of 6 mm were attached to the vertically parting faces 36 via the angles 54 or the channels 52. Braces that are reinforcing members were attached to the horizontally parting faces 32.

The structures for prefabrication made in the factory were transported to a construction site. The length of each of the structures for prefabrication was such that the structures for prefabrication could be loaded on a trailer, so that the structures for prefabrication could be transported to the site. Among the transported structures for prefabrication, first, the structure for prefabrication 34*a*A corresponding to the bottom roll chamber was installed at a construction place, using an on-site crane. After installed at the construction place, the tabular reinforcing plate 70 and the brace were removed from the structure for prefabrication 34*a*A.

The structure for prefabrication 34*a*B was installed at the construction place, using an on-site crane. After installed at the construction place, the tabular reinforcing plate 70 and the brace were removed from the structure for prefabrication 34*a*B. A T-shaped inorganic fiber blanket (packing material 46A) that was made by folding each of two sheets of 12.5 t MAFTEC 6*p* double, and sewing the overlapping portion thereof with an alumina rope was disposed between the vertically parting faces 36. On the horizontally parting faces 32, 12.5 t of MAFTEC 6*p* (packing material 46B), which was folded double, was disposed so as to cover the end faces of the heat insulating materials 40 of the horizontally parting faces 32 without any gap. The packings were fixed to the heat insulating materials attached to the annealing furnace, using L-shaped pins each having a length of 100 mm at pitches of 300 mm.

The channel and the angle joined to the vertically parting faces 36 were fastened with washers and M16 bolts from the channel 52 side, and with collars, washers and nuts from the angle 54 side. The joining face of the channel 52 and the angle 54 was spot-welded at pitches of 200 mm.

The bolts, nuts, washers and collars were removed, and the joining face at bolt holes was line-welded from the side where the fastener holes were larger (from the right of the drawing). Thereafter the joining face of the channel 52 and the angle 54 was line-welded.

The horizontally parted section 34*a* at the first tier was constructed by the above.

Thereafter the horizontally parted section 34*b* at the second tier was constructed by installing, with an on-site crane, and joining the structures for prefabrication 34*b*A and 34*b*B at the second tier according to the same procedures as described above. Thereafter the horizontally parted section 34*a* at the first tier and the horizontally parted section 34*b* at the second tier were line-welded from the top side (i.e., from the side of the angle 54 having a smaller width in the horizontal direction), so that the horizontally parting faces 32 were joined.

The horizontally parted sections 34*a* to 34*j* were formed by repeating the foregoing steps, so that the annealing furnace 100C was constructed. The radiant tubes were installed at predetermined positions of the structures for prefabrication at a stage after the structures for prefabrication were installed at predetermined places respectively with a crane.

INDUSTRIAL APPLICABILITY

An annealing furnace, and a method of constructing the annealing furnace according to the present invention make it possible to install the annealing furnace by a prefabricated construction method even when the annealing furnace has a long length. Therefore it is possible to construct an annealing furnace having a long length by a prefabricated construction method in the inland where transport by a trailer is necessary. Short-term construction is possible because a prefabricated construction method is employed, which leads to the reduction in the amount of time and labor costs. Furthermore, the constructed annealing furnace has strength in structure, and sealability with which the inside is blocked from the outside.

REFERENCE SIGNS LIST

100C annealing furnace
11 entry
19 exit
91 steel strip
93*a* top roll
93*b* bottom roll
93*c* heater
32 horizontally parting face
36 vertically parting face
34 horizontally parted section
34A, 34B structure for prefabrication
52 channel
54 angle
40 heat insulating material
46 packing material
50 shell

The invention claimed is:

1. An annealing furnace that includes a case, and plural rows of rolls at a top and a bottom of an inside of the case, the rolls being configured to convey a steel strip, the annealing furnace comprising:

horizontally parting faces where a body of the furnace is horizontally divided into horizontally parted sections, wherein each of the horizontally parted sections parted by the horizontally parting faces further has vertically parting faces where the horizontally parted section is divided in a direction vertical to a longitudinal direction of the body, and at least one of the vertically parting faces is not at a position same as any of the other vertically parting faces in the horizontally parted sections adjacent thereto in the longitudinal direction of the body.

2. The annealing furnace according to claim 1, wherein positions of vertically adjacent ones of the vertically parting faces in the horizontally parted sections in the longitudinal direction of the body are apart from each other by at least 1 m in the longitudinal direction.

3. The annealing furnace according to claim 1, further comprising a heater configured to heat the steel strip to be conveyed.

4. The annealing furnace according to claim 1, the annealing furnace being a vertical annealing furnace.

5. A structure for prefabrication comprising:

a horizontally parting face and a vertically parting face where a body of the annealing furnace according to claim 1 is divided, the structure for prefabrication constituting the annealing furnace.

6. An annealing furnace that includes a case, and plural rows of rolls at a top and a bottom of an inside of the case, the rolls being configured to convey a steel strip, the annealing furnace comprising:

horizontally parting faces where a body of the furnace is horizontally divided into horizontally parted sections, wherein each of the horizontally parted sections parted by the horizontally parting faces further has vertically parting faces where the horizontally parted section is divided in a direction vertical to a longitudinal direction of the body, wherein structures for prefabrication which are parted at the horizontally parting faces and the vertically parting faces each include a secondary member for connecting the vertically parting faces on the structures for prefabrication to each other, and a width of the secondary member of one of any pair of the structures for prefabrication to be connected together is different from that of another one of the pair in a horizontal direction.

7. The annealing furnace according to claim 6, wherein the secondary member of the one structure for prefabrication of the pair is a secondary member with high strength, and the secondary member of the other structure for prefabrication of the pair is a secondary member easy to be bent.

8. The annealing furnace according to claim 6, wherein the secondary members of the pair of the structures for prefabrication each include a fastener hole for fastening these secondary members to each other, the fastener hole having a size different between the secondary members.

9. The annealing furnace according to claim 6, wherein a packing material is provided on each joining face of the horizontally parting faces and the vertically parting faces on the structures for prefabrication.

10. The annealing furnace according to claim 9, wherein the packing materials provided on the joining faces of the vertically parting faces each have a T-shape.

11. The annealing furnace according to claim 9, wherein the packing materials are formed from an inorganic fiber blanket.

12. The annealing furnace according to claim 6, wherein a case constituting each of the structures for prefabrication is provided with a shell formed from a steel shell on an outside thereof, and a heat insulating material with which the shell is lined.

* * * * *